United States Patent Office 3,553,218
Patented Jan. 5, 1971

3,553,218
2-OXO-7-PHENYL-1,2,3,4,6,7-HEXAHYDRO-11bH-BENZO[a]QUINOLIZINES
Richard Unger, Darmstadt-Eberstadt, and Helmut Müller-Calgan, Darmstadt, Germany, assignors to E. Merck A.G., Darmstadt, Germany
No Drawing. Filed Jan. 6, 1967, Ser. No. 607,666
Claims priority, application Germany, Jan. 7, 1966, 1,595,977
Int. Cl. C07d 39/12
U.S. Cl. 260—286    10 Claims

ABSTRACT OF THE DISCLOSURE 2-oxo-7-phenyl-1,2,3,4,6,7 - hexahydro - 11bH - benzo[a]quinolizines having an effect on the central nervous system.

---

Subject matter of this application relates to copending U.S. application Ser. No. 472,731, filed July 16, 1965, now Pat. 3,393,198, issued July 16, 1968.

This invention relates to 2-oxo-7-phenyl-1,2,3,4,6,7-hexahydro-11bH-benzo[a]quinolizines.

An object of this invention, therefore, is to provide novel quinolizine derivatives, aid methods of producing same.

A further object is to provide novel starting materials and intermediates for the production of the novel quinolizines of this invention.

Another object is to provide novel pharmaceutical compositions, containing quinolizine derivatives as active ingredients.

Still another object is to provide processes of administration for effecting an activity on the central nervous system by the use of the quinolizine derivatives of this invention.

Upon further study of the specification and claims, other objects and advantages of the present invention will become apparent.

For the attainment of the above objects, there are provided 2 - oxo-7-phenyl-1,2,3,4,6,7-hexahydro-11bH-benzo[a]quinolizines of Formula I, as follows:

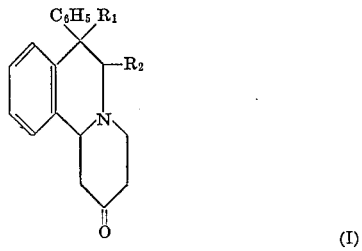

(I)

wherein:

$R_1$ and $R_2$, being the same or different, each represents H or alkyl of 1–4 carbon atoms, and the benzene rings can be mono- or poly-substituted by F, Cl, Br, alkyl of 1–4 carbon atoms, and/or alkoxy of 1–3 carbon atoms, or by methylenedioxy.

These compounds, as well as the physiologically acceptable acid addition and quaternary ammonium salts thereof, possess very valuable pharmacoloical properties. In particular, they are distinguished by a remarkable effect upon the mammalian central nervous system, and they exhibit an excellent compatibility with the mammalian organism. Consequently, these compounds are valuable thymoanaleptics. Furthermore, the compounds of Formula I can be employed as intermediates for the preparation of additional valuable compounds. For instance, they can be reacted with organometallic compounds, such as ethyl lithium, to yield the corresponding 2-substituted 2-hydroxy compounds, such as 2-ethyl-2-hydroxy-7-phenyl-1,2,3,4,6,7-hexahydro-11bH - benzo[a]quinolizine; these compounds, in turn, exhibit a depressant effect upon the central nervous system of mammals (cf., f.e., Belgain Pat. No. 667,214).

When applied subcutaneously in the tetrabenazine test on rats (similarly to the method of Giurgea et al. as described in Medicina Experimentalis 9, 249–262 (1963); catalepsy and ptosis, respectively, induced by tetrabenazine dosages of 10 and 20 mg./kg., respectively, given intravenously), 2 - oxo - 7-phenyl-1,2,3,4,6,7-hexahydro-11bH - benzo[a]quinolizine (A) exhibited $ED_{50}$ values of 14.1 (4.8–41.6) mg./kg. (anti-cataleptic effect) as compared to the commercial products chlorprothixene (B) and thioridazine (C) which exhibited no anticataleptic effect when applied in dosages up to 90.5 and 64 mg./kg., respectively. Furthermore, compound A had an $ED_{50}$ value of 3.1 (1.6–5.8) mg./kg. (antiptotic effect) whereas the $ED_{50}$ value of compound B was 9.1 (4.7–17.8) mg./kg. and compound C showed only a partial inhibition in the dosage range between 1 and 64 mg./kg.

In addition to their pharmacological properties, the compounds of the invention possess a corrosion inhibiting effect.

For the preparation of 2-oxo-7-phenyl-1,2,3,4,6,7-hexahydro-11bH-benzo[a]quinolizines of the Formula I, as well as the acid addition and quaternary ammonium salts thereof, there are alternative processes, to wit:

(A) A 3,4-dihydroisoquinoline of Formula II, or salt thereof

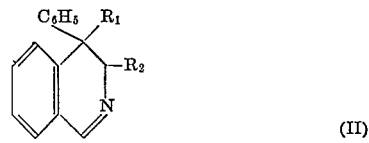

(II)

wherein:

the benezene rings can be substituted in the above-indicated manner, is reacted with methylvinyl ketone, or a Mannich base of acetone (or a preferably quaternary salt of such a Mannich base); or (B) An ester of Formula III

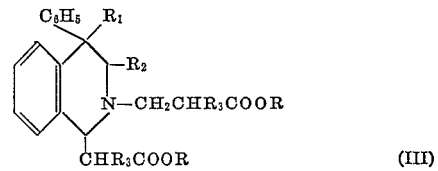

(III)

wherein:

R represents alkyl of 1–4 carbon atoms, and
$R_3$ represents H or COOR,
and wherein the benezene rings can be substituted in the above-indicated manner, is subjected to an intramolecular ester condensation in an inert solvent, in the presence of a cyclization agent, which is preferably alkaline. The thus-obtained ketoester is subsequently saponified and decarboxylated, and, if desired, the resultant compound is converted into physiologically acceptable acid addition salts by treatment with acids, or into physiologically acceptable quaternary ammonium salts by treatment with alkylating agents containing 1–8 carbon atoms; or (C) A base of Formula I is liberated from the acid addition salt thereof.

In the above formulae, alkyl represents methyl, ethyl, propyl, isopropyl, n-butyl, isobutyl, sec.-butyl, or tert. butyl. Alkoxy represents methoxy, ethoxy, propoxy, or isopropoxy.

The preferred process is (A).

Preferred 3,4-dihydro-isoquinolines are those of the general Formulae IIa to IIl:

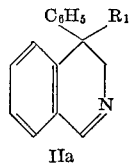 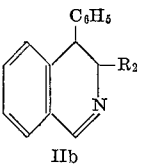 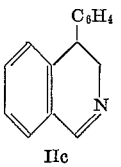

IIa           IIb           IIc wherein:

the benzene rings can be substituted in the above-indicated manner;

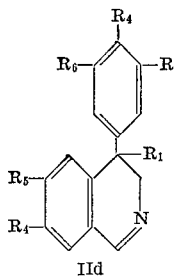 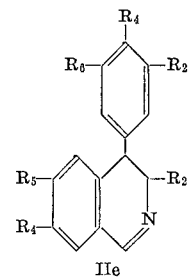 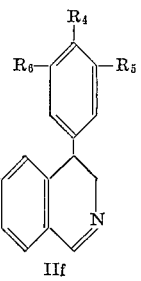

IId           IIe           IIf wherein:

$R_4$, $R_5$ and $R_6$ can be identical or different and represent H, F, Cl, Br, alkyl of 1–4 carbon atoms, or alkoxy of 1–3 carbon atoms, or $R_4$ and $R_5$ together represent methylenedioxy;

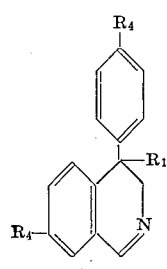 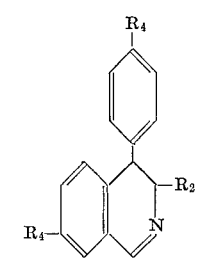 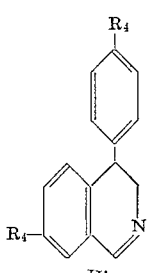

IIg           IIh           IIi

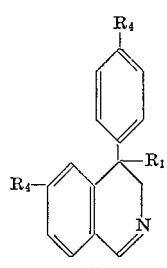 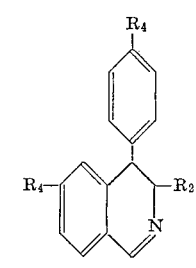 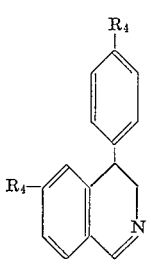

IIj           IIk           IIl

Among the isoquinolines embraced by the preceding formulae, the following 3,4-dihydro-isoquinolines are preferred as starting compounds, in addition to the unsubstituted 4-phenyl-3,4-dihydro-isoquinoline:

3-methyl-4-phenyl-
3-n-propyl-4-phenyl-
4-methyl-4-phenyl-
4-n-butyl-4-phenyl-
4-p-tolyl-7-methyl-
4-(p-isopropylphenyl)-7-isopropyl-
4-phenyl-6-methoxy-
4-(p-fluorophenyl)-7-fluoro-
4-(p-chlorophenyl)-6-chloro-
4-(p-chlorophenyl)-7-chloro-
4-(p-bromophenyl)-7-bromo-
4-phenyl-6,7-methylenedioxy-
4-phenyl-6-methoxy-
4-p-tolyl-6,7-dimethoxy-
4-(3,4-dimethylphenyl)-6,7-dimethyl-
4-(3,4-methylenedioxyphenyl)-6,7-methylenedioxy-
4-(3,4-dimethoxyphenyl)-6,7-dimethoxy-
3-ethyl-4-phenyl-
3-isopropyl-4-phenyl-
3-n-butyl-4-phenyl-
3,4-dimethyl-4-phenyl-
3-methyl-4-ethyl-4-phenyl
4-p-methoxyphenyl-
4-p-methoxyphenyl-7-methoxy-
4-p-fluorophenyl-
4-p-fluorophenyl-6-fluoro-
4-p-chlorophenyl-
4-p-bromophenyl-
4-p-bromophenyl-6-bromo-
4-phenyl-5-chloro-
4-phenyl-6-chloro-
4-phenyl-7-chloro-
4-phenyl-8-chloro-
4-(3,4-methylendioxyphenyl)-
4-(3,4-dimethoxyphenyl)-
4-(3,4,5-trimethoxyphenyl)-
4-(p-isopropoxyphenyl)-6-isopropoxy-
4-(p-n-butyl-phenyl)-7-n-butyl- Preferred Mannich bases of acetone are:

1-dimethylaminobutanone-3
1-diethylaminobutanone-3
1-piperidino-butanone-3
1-morpholino-butanone-3
1-pyrrolidino-butanone-3

Most important of typical quaternary salts of these Mannich bases are the methobromides and the methoiodides.

The reaction of compound II with methylvinyl ketone is preferably conducted by heating the hydrochloride of compound II for about 1–2 hours, in the absence of a solvent, to about 100° C. In place of the hydrochloride, it is, of course, possible to use other salts of compound II as well as, for example, the hydrobromide or—normally with lower yields—the free base II. It is likewise possible to conduct the reaction in the presence of an inert solvent. Suitable solvents, in this connection, are those which are, on the one hand, sufficiently polar in order to dissolve the starting compounds but, on the other hand, do not possess the type of "active" hydrogen atoms which would form undesired side reactions with the methylvinyl ketone. Suitable solvents include, among others, lower alcohols, such as methanol, ethanol, isopropanol, propanol, and tert.-butanol. When employing solvents, the reaction is normally conducted under reflux conditions.

In place of the methylvinyl ketone, it is also possible to use one of the above-mentioned Mannich bases. Preferably, a quaternary salt of a Mannich base is heated together with the base of compound II, or a salt thereof, under the above-indicated conditions, without any solvent or in an inert solvent, such as ethanol. It is likewise possible to employ an acetate of a Mannich base.

The above-described reactions are normally completed after ½ to 48 hours.

Compounds of Formula I can also be obtained by intramolecular ester condensation of dicarboxylic acid esters of Formula III. Typical esters of Formula III are the methyl, ethyl, and tert.-butyl esters of 1-carboxymethyl-2-(2-carboxyethyl)-4-phenyl - 1,2,3,4 - tetrahydro-isoquinoline, as well as the derivatives thereof, substituted analogously to Formulae IIa to IIl.

The ester condensation is conducted in a conventional manner by treating the ester of Formula III with a condensation agent, such as, for example, alkali alcoholate, boron trifluoride, or sodium hydride. The cyclization is suitably conducted in an inert solvent, for example, benzene, ether, or toluene. In a preferred embodiment, the diester III is heated in dry benzene in the presence of sodium ethylate, with a continuous azeotropic distillation of the thus-formed alcohol.

The 2-oxo-1-or -3-carbalkoxy compound of Formula IV or V obtained as the intermediate:

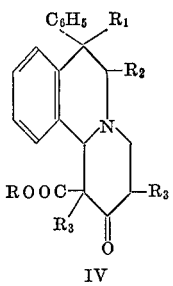 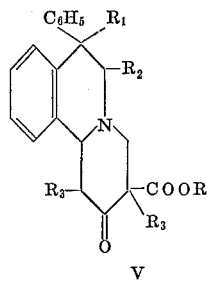

IV    V (wherein the benzene rings can be substituted in the above-indicated manner), is saponified and decarboxylated according to conventional methods. The cleavage of the carbalkoxy group(s) is achieved by treatment with acidic agents, for example, mineral acids, such as aqueous hydrochloric acid, as well as with alkaline agents, such as, for example, dilute caustic soda. According to a preferred embodiment, the ketoester is boiled with 3N-hydrochloric acid.

The compounds which can be prepared in accordance with the present invention possess two, or, in case $R_2$ represents an alkyl group, three asymmetrical carbon atoms. Therefore, they are synthesized in the form of several racemates. Depending upon the method of preparation employed, one or the other of these forms predominates. In many cases, suitably only the predominantly obtained form is isolated. In other cases, wherein both forms are produced, the separation thereof can be accomplished in a conventional manner, for example, by crystallizing the free bases or suitable salts thereof or by chromatography, or by combined utilization of these separation processes. The isolated uniform racemates can be separated into the optically active components thereof by conventional methods, such as by treatment with optically active acids, for example, tartaric acid, camphorsulfonic acid, mandelic acid, malic acid, or lactic acid. Such a separation process can be conducted quite generally along the lines of the methods disclosed in the literature. It is also possible to first separate a starting compound of Formula II or III having at least one asymmetrical carbon atom, into the optical antipodes, and then to further react one or both of these antipodes as indicated above. In this way, optically active final products of Formula I are obtained.

A ketone of Formula I obtained according to the process of this invention (this ketone being racemic or optically active) can be converted in a conventional manner into corresponding acid addition salts. For this reaction, those acids are suitable which yield physiologically acceptable salts. Thus, organic and inorganic acids, such as, for example, aliphatic, alicyclic, araliphatic, aromatic, or heterocyclic, mono- or polybasic carboxylic or sulfonic acids can be used, such as formic acid, acetic acid, propionic acid, pivalic acid, diethylacetic acid, oxalic acid, malonic acid, succinic acid, pimelic acid, fumaric acid, maleic acid, lactic acid, tartaric acid, malic acid, aminocarboxylic acids, sulfamic acid, benzoic acid, salicylic acid, phenylpropionic acid, citric acid, gluconic acid, ascorbic acid, isonicotinic acid, methanesulfonic acid, ethanedisulfonic acid, β-hydroxyethanesulfonic acid, p-toluenesulfonic acid, naphthalenemono- and -disulfonic acids, sulfuric acid, nitric acid, hydrohalic acids, such as hydrochloric acid or hydrobromic acid, or phosphoric acids, such as orthophosphoric acid, etc.

The compounds of Formula I obtained in accordance with the process of this invention can further be converted, by treatment with alkylating agents containing 1–8 carbon atoms, into the corresponding physiologically acceptable quaternary ammonium salts. Among the suitable alkylating agents are alkyl halogenides, such as lower alkyl halides, e.g., methyl iodide, methyl, ethyl, propyl, isopropyl, or butyl bromide; or dialkyl sulfates, particularly lower alkyl, such as dimethyl sulfate; and benzyl halogenides, such as benzyl chloride, or benzyl bromide.

Of course, it is also possible to liberate a base of Formula I by treatment with a stronger base, such as caustic soda or caustic potash solution, from one of its acid addition salts.

According to this invention, preferred subgeneric groups of compounds are the following, as well as the acid addition salts and quaternary ammonium compounds thereof:

(a) The compounds of Formula I wherein $R_2$ is limited to hydrogen.

(b) The compounds of Formula I wherein $R_1$ is limited to hydrogen.

(c) The compounds of Formula I wherein $R_1$ and $R_2$ are limited to hydrogen.

(d) Compounds of the Formula Ia

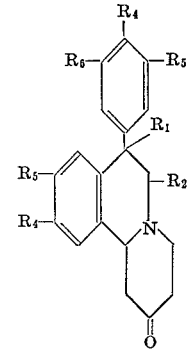

Ia wherein:

$R_4$, $R_5$ and $R_6$ can be identical or different, and represent H, F, Cl, Br, alkyl of 1–4 carbon atoms or alkoxy of 1–3 carbon atoms, and wherein $R_4$ and $R_5$ can together represent methylenedioxy.

Preferred compounds of Formula Ia are those wherein at least four of $R_1$, $R_2$, $R_4$, $R_5$ and $R_6$ are limited to hydrogen.

(e) The compounds of Formula Ia wherein $R_2$ is limited to hydrogen.

(f) The compounds of Formula Ia wherein $R_1$ is limited to hydrogen.

(g) The compounds of Formula Ia wherein $R_1$ and $R_2$ are limited to hydrogen.

(h) The compounds of Formula Ia wherein $R_2$, $R_5$ and $R_6$ are limited to hydrogen.

(i) The compounds of Formula Ia wherein $R_1$, $R_5$ and $R_6$ are limited to hydrogen.

(j) The compounds of Formula Ia wherein $R_1$, $R_2$ $R_5$ and $R_6$ are limited to hydrogen.

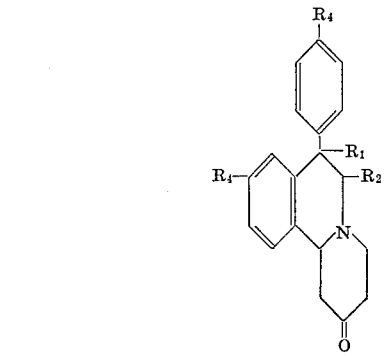

Ib (k) The compounds of Formula Ib wherein $R_2$ is limited to hydrogen.

(1) The compounds of Formula Ib wherein $R_1$ is limited to hydrogen.

(m) The compounds of Formula Ib wherein $R_1$ and $R_2$ are limited to hydrogen.

Aside from those specific preferred compounds of this invention which are described in the following examples, other preferred compounds, among others, are:

6-ethyl-7-phenyl-
6-isopropyl-7-phenyl-
6-n-butyl-7-phenyl-
6,7-dimethyl-7-phenyl-
6-methyl-7-ethyl-7-phenyl-
7-p-methoxyphenyl-
7-p-methoxyphenyl-10-methoxy-
7-p-fluorophenyl-
7-p-fluorophenyl-9-fluoro-
7-p-chlorophenyl-
7-p-bromophenyl-
7-p-bromophenyl-9-bromo-
7-phenyl-8-chloro-
7-phenyl-9-chloro-
7-phenyl-10-chloro-
7-phenyl-11-chloro-
7-(3,4-methylendioxyphenyl)-
7-(3,4-dimethoxyphenyl)-
7-(3,4,5-trimethoxyphenyl)-

The starting compounds of Formulae II and III are all novel; however, they can be readily produced analogously to known compounds.

For example, 3,4-dihydro-isoquinolines of Formula II can be obtained by reacting 2,2-diarylethylamines of the formula $(C_6H_5)_2CR_1CHR_2NH_2$ (wherein the two phenyl groups can be substituted in the above-indicated manner, but wherein at least one of the o-positions must carry a hydrogen atom) with formic acid to obtain the corresponding N-formyl derivative, and by subsequent ring closure with the aid of one of the customary cyclization agents (for example, polyphosphoric acid). This type of synthesis of 3,4-dihydroisoquinolines (Bischler-Napieralski reaction) is well known in the art (cf., fe., Organic Reactions, vol. VI, pp. 74–150, 1951, New York, John Wiley & Sons Inc.).

Esters of Formula III can be obtained, for example, by reacting 2,2-diarylethylamines of the above formula with malonic acid ester, cyclizing the thus-formed semi-ester amides, catalytically hydrogenating the 1,2-double bond in the thus-obtained 3,4-dihydroisoquinoline, and alkylating the thus-produced secondary amino ester with an acrylic acid ester or a β-halogenopropionic acid ester at the nitrogen atom. (See, for example, German Pat. 1,068,261.)

The novel compounds can be employed with conventional pharmaceutical excipients. Carrier substances can be such organic or inorganic compounds suitable for parenteral, enteral, or topical application and which do not react with the novel compounds, such as, for example, water, vegetable oils, polyethylene glycols, gelatin, lactose, amylose, magnesium stearate, talc, vaseline, cholesterol, etc. For parenteral application, particularly oil or aqueous solutions, as well as suspensions, emulsions, or implants are employed.

For enteral application, furthermore, suitable are tablets or dragees which are also characterized by the presence of talc or a carbohydrate carrier or binder. A syrup or the like can also be used wherein a sweetened vehicle is employed.

For topical application salves or creams are used which can, if desired, be sterilized or mixed with auxiliary substances, such as preservatives, stabilizers, or wetting agents, or salts for influencing the osmotic pressure, or with buffer substances.

The substances of this invention are preferably administered to mammals in dosages of 0.1 to 100 mg. per dosage unit. In such compositions, the carrier is usually present in an amount of 1–5,000 mg.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

(a) 100 g. 4-phenyl-3,4-dihydro-isoquinoline hydrochloride are mixed with 200 ml. methylvinylketone and heated for 90 minutes on a steam bath. After cooling, about 250 ml. acetone are added, and the reaction solution is allowed to stand overnight, in the cold state. Thereafter, the product which has crystallized, is vacuum-filtered and washed out with acetone and ether. There are obtained 87 g. 2 - oxo - 7-phenyl-1,2,3,4,6,7-hexahydro-11bH-benzo[a]quinolizine hydrochloride, M.P. 211° C.

The free base, which can be produced by dissolving the hydrochloride in water and adding caustic soda, melts at 138° C. The hydrobromide has a melting point of 188° C.

Preparation of the starting product 455 g. 2,2-diphenyl-ethylamine are mixed, under ice cooling, with 115 g. formic acid, and then heated for three hours at 180° C. Thereupon, another 58 g. formic acid are added, and the reaction mixture is maintained at 180° C. for an additional nine hours. The water, which is split off, distils off during this period. The residue is distilled under vacuum. There are obtained 508 g. N-formyl-2,2-diphenyl-ethylamine, B.P.$_{0.01}$ 160° C. The distillate slowly crystallizes completely.

300 g. N - formyl - 2,2-diphenyl-ethylamine are added, under stirring, to a mixture of 650 g. phosphorus pentoxide and 500 g. orthophosphoric acid and heated, within 30 minutes, to 200° C. This temperature is maintained for two hours, and then the reaction mixture is cooled to about 120–140° C. and 500 ml. water are slowly added. Thereafter, 1,500 ml. 47% caustic potash solution is added dropwise under cooling. The cooled solution is extracted with ether, and the ether solution is concentrated by evaporation. There are obtained 384 g. 4-phenyl-3,4-dihydro-isoquinoline, B.P.$_{0.4}$ 145° C. The hydrochloride, precipitated from ether, melts at 175° C. and can be recrystallized from ethanol.

Analogously, the following compounds are obtained:

with 3 - methyl - 4-phenyl-3,4-dihydro-isoquinoline hydrochloride (M.P. 210° C.; produced from 1,1-diphenyl-2-aminopropane by way of the N-formyl derivative thereof)—2 - oxo - 6-methyl-7-phenyl-1,2,3,4,6,7-hexahydro-11bH-benzo[a]quinolizine, M.P. 120° C.; B.P. 190° C./0.05 mm.; hydrochloride M.P. 183° C.;

with 4 - n - butyl-4-phenyl-3,4-dihydro-isoquinoline hydrochloride (M.P. 180° C.; produced from 2,2-diphenyl-1-hexylamine)—2 - oxo - 7 - n-butyl-7-phenyl-1,2,3,4,6,7-hexahydro-11bH-benzo[a]quinolizine, M.P. 107° C.; hydrochloride M.P. 153° C.;

with 4 - p - tolyl-7-methyl-3,4-dihydro-isoquinoline hydrochloride (M.P. 200° C.; produced from 2,2-bis-p-tolyl-ethylamine)—2 - oxo - 7-p-tolyl-10-methyl-1,2,3,4,6,7-hexahydro-11bH-benzo[a]quinolizine, M.P. 159° C.; hydrochloride M.P. 217° C.

(b) 500 mg. 2 - oxo - 7 - phenyl-1,2,3,4,6,7-hexahydro-11bH-benzo[a]quinolizine are boiled with 1 ml. methyl iodide in 10 ml. acetonitrile for two hours. After concentrating the solution by evaporating the same, the corresponding methoiodide is obtained.

EXAMPLE 2

21 g. 4-phenyl-3,4-dihydro-isoquinoline are dissolved in 200 ml. ethanol and, after the addition of 25 g. 3-oxo-butyl-trimethylammonium iodide, boiled for two hours.

Subsequently, 200 ml. water are added, the alcohol is distilled off under vacuum, the remaining mixture is made alkaline with caustic soda, and extracted with chloroform. The chloroform extract is concentrated to a small volume, and then, by the addition of ethereal hydrochloric acid, the 2 - oxo-7-phenyl-1,2,3,4,6,7-hexahydro-11bH-benzo[a] quinolizine hydrochloride is precipitated, M.P. 211° C.

EXAMPLE 3

15.5 g. 1-piperidino-butanone-(3) are dissolved in 200 ml. ethanol and neutralized by the addition of 6 g. glacial acetic acid. To this solution, there are added 18 g. 4-phenyl-3,4-dihydro-isoquinoline, and the reaction mixture is boiled for three hours. Thereafter, water is added, and the alcohol is distilled off. The further working-up procedure is conducted as described in Example 2. There is obtained 2 - oxo-7-phenyl-1,2,3,4,6,7-hexahydro-11bH-benzo[a]quinolizine hydrochloride, M.P. 211° C.

EXAMPLE 4

2.5 g. sodium are dissolved in 90 ml. absolute ethanol. The ethanol is removed under vacuum, and a solution of 28 g. 1-ethoxy-carbonyl-methyl-2-(2-ethoxy-carbonyl-ethyl)-4-phenyl-1,2,3,4-tetrahydro-isoquinoline in 500 ml. absolute benzene is added to the dry sodium ethylate. The reaction mixture is heated under stirring, the alcohol formed thereby being distilled off azeotropically. Upon reaching a temperature of 78° C., the distillation is terminated; then, the reaction mixture is boiled for one hour under reflux, cooled, and the benzene solution is extracted with dilute caustic soda and water. The combined alkaline extracts are cooled. By the introduction of carbon dioxide, crude 2 - oxo-3-ethoxycarbonyl-7-phenyl-1,2,3,4,6,7,-hexahydro-11bH-benzo[a]quinolizine is obtained, which is boiled with 100 ml. 3 N hydrochloric acid for five hours. After cooling, the reaction mixture is washed with ether, and the 2 - oxo - 7 - phenyl-1,2,3,4,6,7 - hexahydro-11bH-benzo[a]quinolizine is preceipitated with cuastic soda, M.P. 138° C.

The starting material is obtained by reacting 2,2-diphenyl-ethylamine with ethoxycarbonyl acetyl chloride in ether, to form N-(2,2-diphenylethyl)-malonamide acid ethyl ester, cyclization of the same by 30 minutes of boiling with phosphorus pentoxide in tetrahydronaphthalene, to form 1-ethoxycarbonyl-methyl-4-phenyl-3,4-dihydro-isoquinoline, hydrogenation on platinum in glacial acetic acid, to form tetrahydro-isoquinoline, and boiling of same for 24 hours with acrylic acid ethyl ester.

EXAMPLE 5

(a) Analogously to Example 1(a), there are obtained, by reacting the correspondingly substituted 3,4-dihydro-4-phenyl-isoquinolines with methylvinylketone, the following 2 - oxo - 1,2,3,4,6,7-hexahydro-11bH-benzo[a]quinolizine and, by reacting the latter with hydrochloric or hydrobromic acid, the corresponding hydrochlorides or hydrobromides:

6-n-propyl-7-phenyl-
7-methyl-7-phenyl-
7-p-isopropylphenyl-10-isopropyl-
7-p-methoxyphenyl-9-methoxy-
7-p-fluorophenyl-10-fluoro-
7-p-chlorophenyl-9-chloro-
7-p-chlorophenyl-10-chloro-
7-p-bromophenyl-10-bromo-
7-phenyl-9,10-methylenedioxy-
7-phenyl-9-methoxy-
7-p-tolyl-9,10-dimethoxy-
7-(3,4-dimethylphenyl)-9,10-dimethyl-
7-(3,4-methylenedioxyphenyl)-9,10-methylenedioxy-
7-(3,4-dimethoxyphenyl)-9,10-dimethoxy-
7-(p-n-butylphenyl)-10-n-butyl-
7-(p-isopropoxyphenyl)-9-isopropoxy-.

(b) Analogously to Example 1(b), the corresponding methoiodides are obtained by reacting the aforementioned bases with methyl iodide.

The following examples cover suitable pharmaceutical compositions which can be prepared according to conventional standards.

Example A.—Tablets

| | Mg. |
|---|---|
| 2-oxo-7 - phenyl - 1,2,3,4,6,7 - hexahydro-11bH-benzo[a]quinolizine hydrochloride | 50 |
| Lactose | 100 |
| Corn starch | 40 |
| Talc | 10 |

Example B.—Coated tablets

| | Mg. |
|---|---|
| 2-oxo - 7 - phenyl - 1,2,3,4,6,7 - hexahydro-11bH-benzo[a]quinolizine hydrochloride | 50 |
| Lactose | 100 |
| Talc | 10 |

The coating consists of a mixture of cane sugar, talc, wheat starch, and tragacanth and weighs about 100 mg.

Example C.—Hard gelatine capsules

Each hard gelatine capsule is filled with a fine powder consisting of:

| | Mg. |
|---|---|
| 2 - oxo - 7 - phenyl - 1,2,3,4,6,7 - hexahydro - 11bH-benzo[a]quinolizine hydrochloride | 50 |
| Lactose | 140 |
| Talc | 8 |
| Magnesium stearate | 2 |

Example D.— Solution for injections

A solution of 1 kg. of 2-oxo-7-phenyl-1,2,3,4,6,7-hexahydro - 11bH-benzo[a]quinolizine hydrochloride in 199 litres of distilled water is prepared and filled into 2 ml. ampoules in such a manner that each ampoule contains 10 mg. of the active ingredient.

Example E.—Syrup

The unit dosage contains:

| | Mg. |
|---|---|
| 2 - oxo - 7 - phenyl - 1,2,3,4,6,7 - hexahydro - 11bH-benzo[a]quinolizine hydrochloride | 50 |
| Cane sugar | 300 |
| Glycerol (twice distilled) | 500 |
| Methyl p-hydroxybenzoate | 4 |
| Propyl p-hydroxybenzoate | 2 |
| Flavorings, as desired. | |
| Water (distilled) | 4,150 |

Instead of 2-oxo-7-phenyl - 1,2,3,4,6,7 - hexahydro-11bH-benzo[a]quinolizine hydrochloride, the corresponding free base or other physiologically compatible acid addition or quaternary ammonium salts of the same base as well as other compounds embraced by Formula I or their physiologically compatible acid addition or quaternary ammonium salts can be incorporated into similar pharmaceutical preparations.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:
1. A member selected from the group consisting of the following formula and a physiologically acceptable acid addition salt thereof:

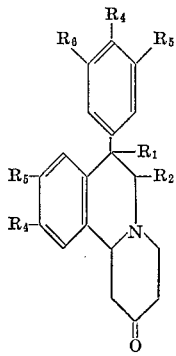

wherein:
$R_1$ and $R_2$ each is H or alkyl of 1-4 carbon atoms with the provision that $R_1$ and $R_2$ do not simultaneously represent tert. butyl; and
$R_4$, $R_5$ and $R_6$ each is H, F, Cl, Br, alkyl of 1-4 carbon atoms, alkoxy of 1-3 carbon atoms, or $R_4$ and $R_5$ can together represent methylenedioxy, with the provision that adjacent R groups do not simultaneously represent tert. butyl.

2. A member as defined by claim 1 wherein $R_2$ is hydrogen.

3. A member as defined by claim 1 wherein $R_1$ is hydrogen.

4. A member as defined by claim 1 wherein $R_1$ and $R_2$ are hydrogen.

5. A member as defined by claim 1 wherein $R_2$, $R_5$ and $R_6$ represent hydrogen.

6. A member as defined by claim 1 wherein $R_1$, $R_5$ and $R_6$ represent hydrogen.

7. A member as defined by claim 1 wherein $R_1$, $R_2$, $R_5$ and $R_6$ represent hydrogen.

8. A member selected from the group consisting of a compound of the following formula and a physiologically acceptable acid addition salt thereof:

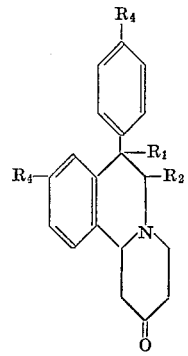

wherein:
$R_1$ and $R_2$ are as defined by claim 1 and $R_4$ is H or alkyl of 1-3 carbon atoms.

9. A member as defined in claim 8 wherein only one of $R_1$, $R_2$ and $R_4$ is alkyl of 1-4 carbon atoms.

10. A member as defined by claim 1 wherein said member is 2-oxo-7-phenyl - 1,2,3,4,6,7-hexahydro-11bH-benzo[a]quinolizine or a pharmaceutically acceptable acid addition salt thereof.

References Cited

UNITED STATES PATENTS

| | | | |
|---|---|---|---|
| 2,997,475 | 8/1961 | Brossi et al. | 260—286 |
| 3,009,918 | 11/1961 | Openshaw | 260—289 |
| 3,209,005 | 9/1965 | Brossi et al. | 260—289X |
| 3,393,198 | 7/1968 | Unger et al. | 260—286 |

FOREIGN PATENTS 6,508,468  1/1966  Netherlands.

OTHER REFERENCES

Denwent Delayed Belgian Reports No. 4/66, Abstracting Belgian Patent 667,214.

DONALD G. DOUS, Primary Examiner

U.S. Cl. X.R.

260—247.5, 283, 287, 289, 293, 326,85, 562; 424—58

UNITED STATES PATENT OFFICE
CERTIFICATE OF CORRECTION

Patent No. 3,553,218     Dated January 5, 1971

Inventor(s) Richard Unger and Helmut Müller-Calgan

It is certified that error appears in the above-identified patent and that said Letters Patent are hereby corrected as shown below:

Column 12, Line 20, change "of 1-3 carbon" to --- of 1-4 carbon---

Signed and sealed this 27th day of April 1971.

(SEAL)
Attest:

EDWARD M. FLETCHER, JR.
Attesting Officer

WILLIAM E. SCHUYLER, JR.
Commissioner of Patents